United States Patent
Hirsch

(10) Patent No.: US 6,603,979 B1
(45) Date of Patent: Aug. 5, 2003

(54) RE-SYNCHRONIZATION METHOD FOR A COMMUNICATION DEVICE

(75) Inventor: Olaf Josef Hirsch, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 420 days.

(21) Appl. No.: 09/603,931

(22) Filed: Jun. 27, 2000

(51) Int. Cl.$^7$ .................. H04B 15/00; H04B 7/005; H04B 7/01; H04B 7/015
(52) U.S. Cl. ..................................... 455/502
(58) Field of Search ................. 455/343, 574, 455/502; 375/359; 340/732

(56) References Cited

U.S. PATENT DOCUMENTS

| 6,028,855 A | 2/2000 | Hirsch |
| 6,212,398 B1 * | 4/2001 | Roberts et al. ............. 455/502 |

FOREIGN PATENT DOCUMENTS

| EP | 0817403 | 1/1998 |
| EP | 1143633 | 10/2001 |
| WO | WO 0004738 | 1/2000 |
| WO | WO 0176089 | 10/2001 |

OTHER PUBLICATIONS

By ETSI TS 125 213 Universal Mobile Telecommunications System (UMTS); Spreading and Modulation (FDD) V3.3.0 Mar. 2000, pp. 1–27.

* cited by examiner

Primary Examiner—Nguyen T. Vo
Assistant Examiner—David Nguyen
(74) Attorney, Agent, or Firm—Michael Schmitt

(57) ABSTRACT

A cellular communication system has a number of cells covered by radio base stations communicating with communication device. The communication devices have a master timer for internally timing the communication devices relative to a timing of the cellular communication system. The master timer of a communication device is initially synchronized to a timing reference of a radio base station that provides the currently best communication link. Upon initial synchronization, the communication device determines and stores a first channel profile of received multi-path signals relative to the initial synchronization, and then enters a sleep mode. In the sleep mode a timing reference that controls the master timer is switched off. From the sleep mode, the communication device enters a receive mode and switches on its timing reference. The communication device then determines a second channel profile of received multi-path signals, and derives a timing offset signal from a best fit obtained by fitting the first channel profile to the second channel profile. Finally, the communication device re-synchronizes the master timer on the basis of the derived timing offset signal. The first and second channel profiles are characteristic in time to a particular configuration of radio base stations.

9 Claims, 3 Drawing Sheets

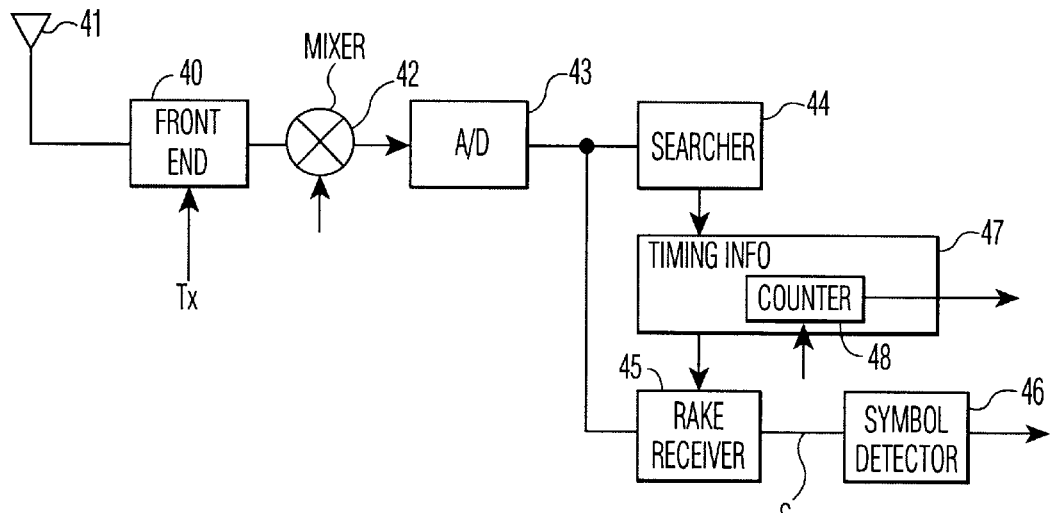
FIG. 3
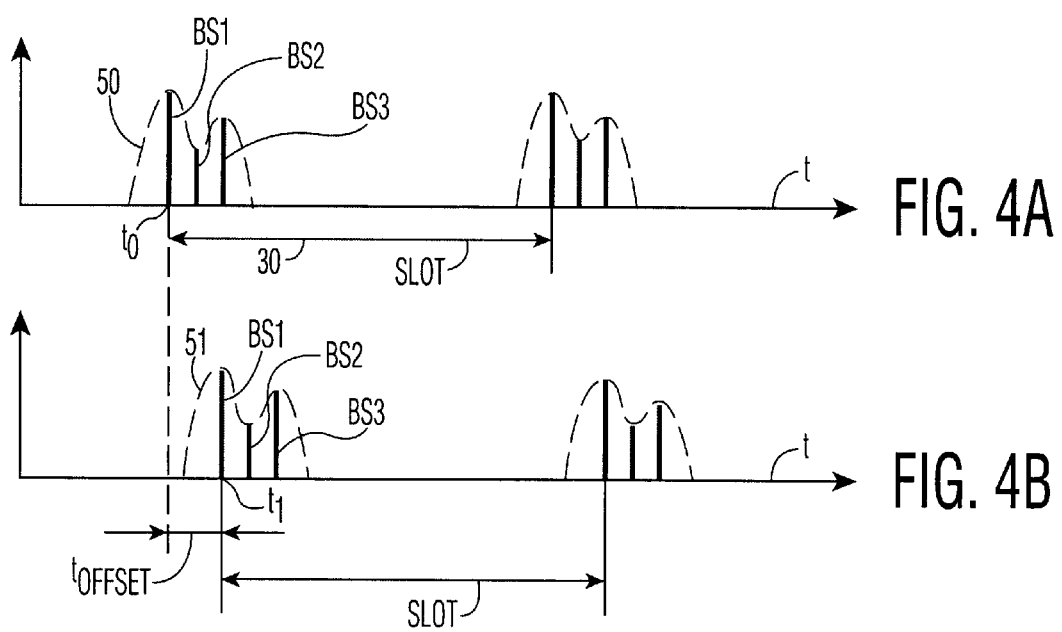
FIG. 4A
FIG. 4B

RE-SYNCHRONIZATION METHOD FOR A COMMUNICATION DEVICE

BACKGROUND OF THE INVENTION

1. Field of The Invention

The present invention relates to a method of re-synchronizing a communication device comprised in a cellular communication system, more particularly to such re-synchronization when the communication device wakes up from a sleep mode after initial synchronization to a radio base station comprised in the cellular communication system.

2. Description of The Related Art

Cellular mobile radio or communication systems are well-known. Such cellular mobile radio systems comprise cells or radio zones, together covering a given geographical area. The cells include radio base stations that, through control and communication channels, establish and maintain communication links with mobile radio devices that are comprised in the mobile radio system, and communicate with the mobile radio devices through established communication links.

One type of a cellular communication system is a Universal Mobile Telecommunication System (UMTS) spread spectrum system proposed by the $3^{rd}$ Generation Partnership Project (3GPP). In the 3GPP ETSI publication ETSI TS 125.213, V3.2.0 (2000–03), pp. 1–27 spreading and modulation is described for a 3GPP UMTS spread spectrum system. In such a system, but also in other systems, radio base stations communicate with mobile radio device using slots based transmission schemes. When the mobile radio device is powered on, it needs to synchronize its internal timing to the timing of the cellular communication system, more particularly to timing of a radio base station among radio base stations in the neighborhood of the mobile radio station that provides the best communication link. In order for a mobile radio station to be able to synchronize to and establish communication with a particular radio base station, in the proposed 3GPP system the radio base stations repetitively transmit synchronization burst on a so-called primary synchronization channel (PSCH) and a secondary synchronization channel (SSCH) in the form of so-called Golay sequences, and so-called Gold code scrambled signals on a primary common control channel (PCCCH), as described in the above 3GPP ETSI publication. All radio base stations transmit the same synchronization pattern at their PSCH, transmit different but not uniquely base station identifying synchronization patterns at their SSCH, and eventually base station identifying information at their PCCCH. In a spread spectrum system of a direct sequence type, such as in the proposed 3GPP system, the mobile radio device typically has a so-called Rake receiver with a number of Rake fingers to resolve multi-path received signals and to combine multi-path resolved signals so as to improve the signal-to-noise ratio of the received signal. The timing of the fingers in the Rake receiver is controlled by timing signals generated by a so-called spread spectrum searcher. The searcher is used for initial synchronization of the mobile radio device, upon powering up of the device. After initial synchronization, tracking mode synchronization is adopted. In between multiple slots, in the so-called idle mode, in order to save power, a mobile radio device enters a sleep mode by switching off a major part of its reception circuitry, including its local timing reference, usually a voltage controlled crystal oscillator, while keeping a master timer such as a counter running, but at a substantially lower clock frequency. In the sleep mode, the mobile radio device looses some of its synchronization. Therefore, before reception a next paging signal from the radio base station, the internal timing of the mobile radio device needs to be adjusted. More particularly, the master timer needs to be re-synchronized to the timing of the radio base station it was previously locked to and, possibly, was communicating with. In systems like the proposed 3GPP system, the re-synchronization process is the same as the initial synchronization process to synchronize to a particular neighboring radio base station, and is a three-step process that is performed by the searcher. Such three-step process is a time and power consuming process. Firstly, after the mobile radio device transitioned from idle mode into receive mode by switching on its timing reference and other circuitry that was switched off during idle mode, the spread spectrum searcher, e.g. implemented as a matched filter, searches for the primary synchronization channel. Within a time slot between successive transmission bursts from the radio base station, at a PSCH synchronization step, the matched filter resolves base station signals of neighboring base stations, without identifying a particular base station. Secondly, at a SSCH synchronization step, in which a matched filtering operation is followed by a fast Hadamard transformation, a non-uniquely base station identifying group code of each resolved base station is obtained. Finally, at a third, PCCCH information reception step, usually performed by a correlator correlating the received PCCCH information with different Gold scrambling codes, the best correlation match provides the desired radio base station. This three-step process is performed by the searcher both during initial synchronization and re-synchronization.

SUMMARY OF THE INVENTION

It is an object of the invention to provide a fast re-synchronization method, with a minimum number of steps and with minimum power consumption.

It is another object of the invention to provide, upon initial synchronization to a radio base station of the system, re-synchronization to the same radio base station when the communication device wakes up from a sleep mode entered after the initial synchronization.

It is still another object of the invention to provide re-synchronization through fitting of multi-path transmission patterns that are characteristic in time for a particular configuration of radio base stations.

In accordance with the invention, a method of re-synchronizing a communication device that is comprised in a cellular communication system is provided, said method comprising:

initially synchronizing a master timer of said communication device to a first timing reference of a radio base station comprised in said cellular communication system;

determining and storing a first channel profile of received multi-path, signals relative to said initial synchronization;

entering a sleep mode after said initial synchronization, in said sleep mode switching off a second timing reference that controls said master timer;

from said sleep mode, entering a receive mode, in said receive mode, switching on said second timing reference;

determining a second channel profile of received multi-path signals;

deriving a timing offset signal from a best fit obtained by fitting said first channel profile to said second channel profile; and re-synchronizing said master timer on the basis of said derived timing offset signal.

The invention is based on the insight that multi-path transmission patterns that are characteristic in time for a particular configuration of radio base stations do not change over a relatively short period of time such as a period between transmission of multiple time slots, and thus can be used to derive a timing offset for re-synchronization of the communication device after it wakes up from a sleep mode.

Advantageously, the channel profiles are fitted using a mean-square error fitting method, more particularly a mean-square error method fitting replica of said second channel profile to said first channel profile, said replica being time shifted versions of said second channel profile as time shifted over a fraction of a reception time slot of said cellular communication system. Herewith, the timing offset signal is obtained by a simple and robust method.

BRIEF DESCRIPTION OF THE DRAWING

FIG. 3 shows a communication device according to the invention.

FIG. 4 is a timing diagram illustrating adjustment of a master timer in a communication device according to the invention.

Throughout the figures the same reference numerals are used for the same features.

DESCRIPTION OF THE DETAILED EMBODIMENTS

Figure 1:
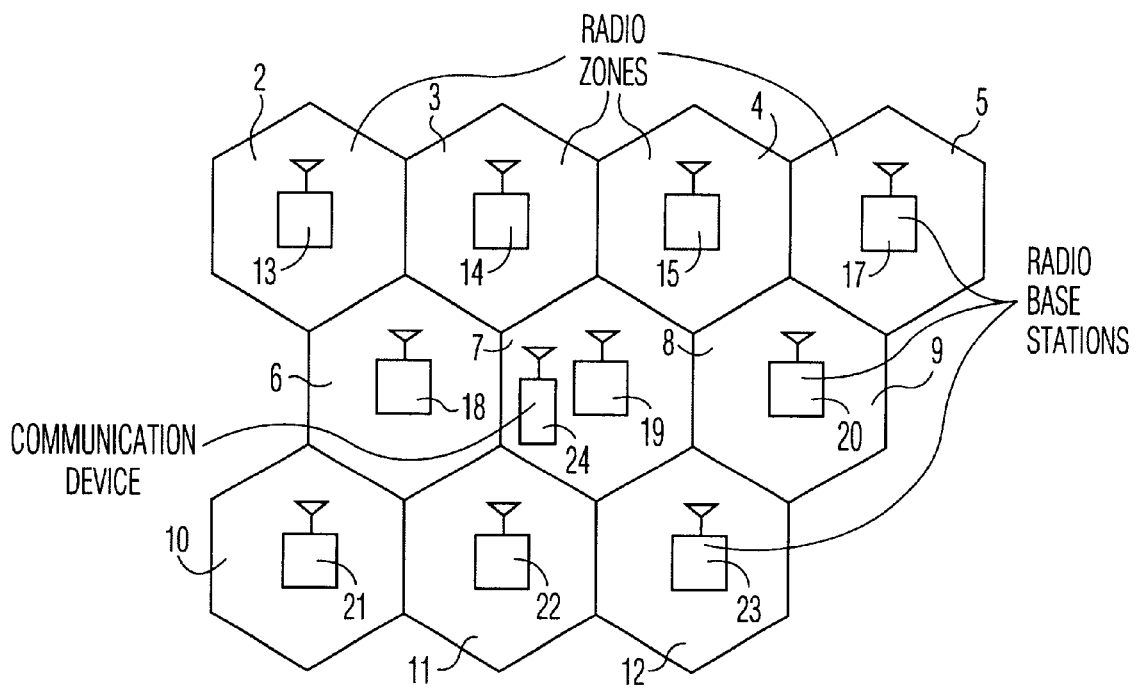
FIG. 1 schematically shows a cellular communication system according to the invention.

FIG. 1 schematically shows a cellular communication system 1 according to the invention. The system 1 comprises radio zones 1 to 12, each respectively comprising radio base stations 13–23. A communication device 24 is comprised in the radio zone 7. The device 24 may be a cell phone or handset, or any other suitable communication device. In the example given, the system is a direct sequence spread spectrum system with a slot based transmission scheme. Groups of radio base stations are coupled to switching centers (not shown), and the switching centers are coupled to each other. Such a cellular communication system, which may be a 3GPP system for instance, is well known in the art.

Figure 2:
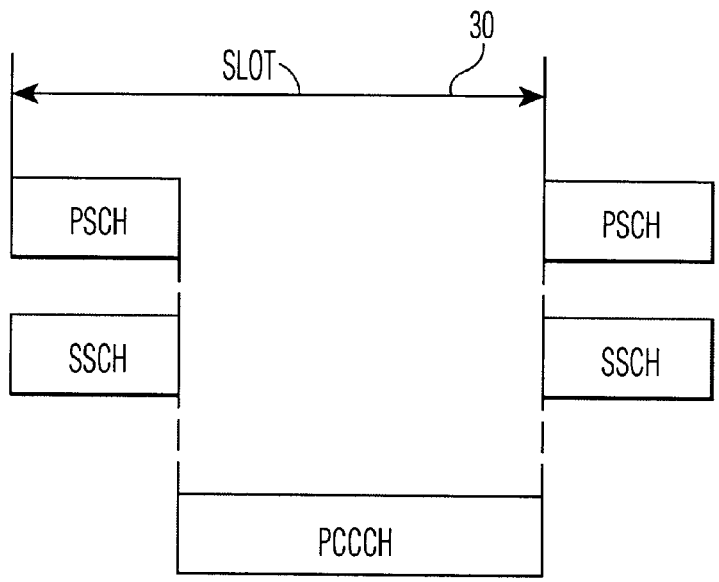
FIG. 2 shows a prior art synchronization channel configuration.

FIG. 2 shows a prior art synchronization channel configuration that is used by the system 1. The shown configuration is described in said 3GPP ETSI Publication. Shown is a primary common control channel PCCCH that is used by the radio base stations 13–23 to broadcast data to communication devices in the system 1, and further a primary synchronization channel PSCH and a secondary synchronization channel SSCH. The radio base stations 12–23 repetitively broadcast data at the common control channel and synchronization patterns at the synchronization channels, using slot based transmission scheme i.e., transmission is repeated after a time slot 30. For initial synchronization of the communication device 24 to the cellular system 1, when the device 24 is powered up, the communication device is set into a receive mode, and a timing reference is switched on, the device 24 performs a three-step synchronization process. Firstly, a spread spectrum searcher in the communication device 24 searches for a synchronization pattern at the primary synchronization channel PSCH, as broadcast by neighboring radio base stations, then searches for a base station group code at the secondary synchronization SSCH, as received from radio base stations acquired in the first synchronization step, and finally receives data from the acquired radio base stations that uniquely identify the radio base station. The communication device 24 synchronizes to the radio base station that provides the currently best communication link. In between receiving bursts of data from the radio base station, the communication device 24 adopts a sleep mode in which the timing reference, and other reception circuitry not needed in the sleep mode, is switched off. Typically, a multiple slot sleep time is 720 msec. The timing reference is a voltage controlled crystal oscillator, for instance. Before receiving a next data burst from the radio base station, the timing reference and the other switched off circuitry is switched on. Due to switching off of the timing reference, and because it is less accurate and runs at a lower clock frequency when in the sleep mode, the communication device 24 looses some of its synchronization to the system 1. As will be described with reference to FIGS. 3–6, re-synchronization of the communication device 24 after the communication device 24 transitioned from the sleep mode to the receive mode uses a far better and faster process than the described initial three-step synchronization process.

FIG. 3 shows the communication device 24 according to the invention. In the example given, the communication device 24 is a direct sequence spread spectrum device operating in idle mode, among other modes. In between receiving/transmitting bursts of data, the communication device adopts a sleep mode during which a timing reference is switched off so that some loss of synchronization to the system 1 occurs. The communication device 24 comprises a radio transmission and reception front end 40 that is coupled to an antenna 41. A transmission branch is indicated by Tx. For the purpose of the invention only a reception branch is shown in further detail. The radio front end 40 is coupled to down-mixing means so as to obtain a base band signal, or, possibly, a low intermediate frequency signal from a received radio frequency signal. The down-mixing means can be a single or multistage quadrature mixer. Shown is a single stage mixer 42. In principle, all signals to be further processed are complex spread spectrum signals. Mixed-down base band or low intermediate frequency spread spectrum signals are sampled by analog-to-digital converters. For reasons of simplicity, only a single analog-to-digital converter 43 is shown. In the example given, the sampled mixed-down complex signal is a base band signal. Programmed processing means and, possibly, further hardware means, processes the sampled mixed-down signals. Such programmed processing means generally comprise a processor, and volatile and non-volatile memory means. To process the sampled mixed-down spread spectrum signals, the communication device 24 comprises a spread spectrum searcher 44, a so-called Rake receiver 45, and a symbol detector 46 that is coupled to an output of the Rake receiver 45. The searcher 44 resolves multi-path received signals, and provides timing information 47 to so-called Rake fingers (not shown in detail) of the Rake receiver 45. The Rake receiver 45 diversity combines resolved multi-path received signals to form a multi-path received diversity combined signal S that is supplied to the symbol detector 46. Such a searcher/Rake receiver is well known in the art. The communication device 24 further comprises a master timer, in the example given a counter 48 that provides a local master timer or clock signal to which operations performed by the communication device are synchronized. Upon initial synchronization, as described, the master timer is synchronized to the system 1. In accordance with the invention, upon waking up from the sleep mode to a receive mode, the master timer is re-synchronized to the system 1 in a fast and simple way.

FIG. 4 is a timing diagram illustrating adjustment of the master timer or counter 48 in a communication device according to the invention. In FIG. 4A, at a repetition rate of the reception slot 30, multi-path resolved signals BS1, BS2, and BS3 are received from an instant t=$t_o$, from neighboring base stations 19, 18, and 22. A currently best signal, the signal BS1, is received from the radio base station 19, at the instant t=$t_o$. Upon initial synchronization, using the described three-step synchronization process, the counter 48 is synchronized to the radio base station 19. Before entering the sleep mode, according to the invention, the communication device 24 stores a channel profile of received multi-path signals or envelope 50. FIG. 4B shows multi-path received signals from the base stations 18, 19, and 22, upon waking up of the communication device 24 from the sleep mode, after some loss of synchronization to the system 1 has occurred, a relative time shift or timing offset t=$t_{offset}$. According to the invention, the relative time shift $t_{offset}$, is determined by fitting the stored envelope 50 to a channel profile or envelope 51 determined upon waking up from the sleep mode, and by adjusting the counter 48 accordingly.

Figure 5:
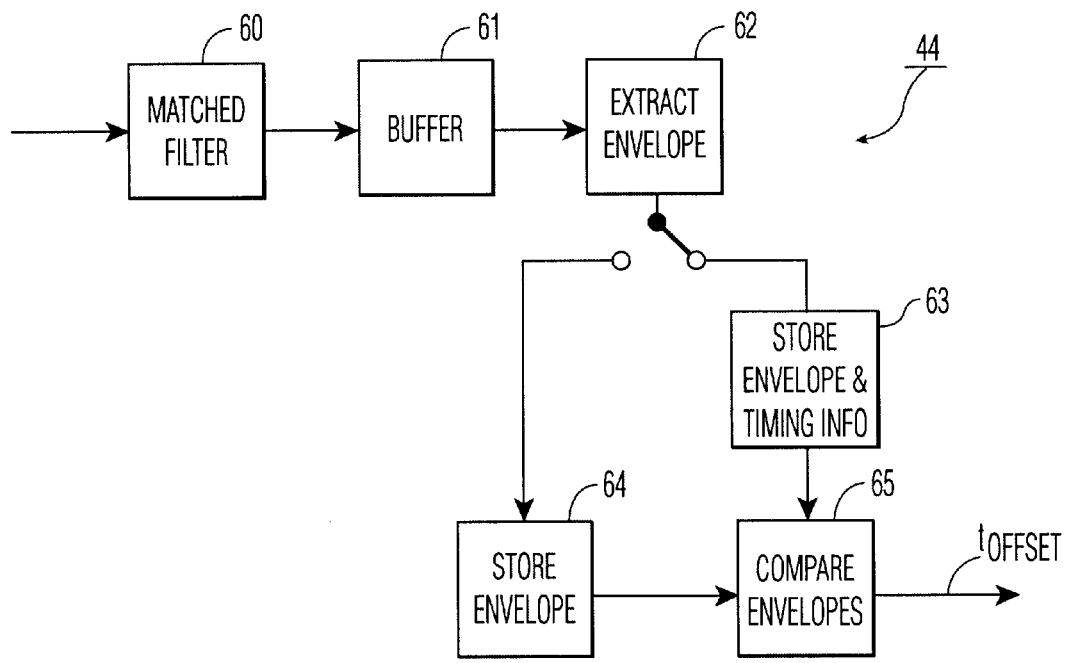
FIG. 5 illustrates generating of a timing offset according to the invention.

FIG. 5 illustrates generating of the timing offset $t_{offset}$ according to the invention. To this end, the searcher 44 comprises a matched-filter 60 that provides peaks and relative timing of the peaks of the received multi-path signals, i.e., of the signals BS1, BS2, and BS3. All received multi-path signal information corresponding to a slot, as provided by the matched-filter, is stored in a buffer 61, and, using a known envelope extraction method, such as a method based upon splines, the envelope 50 is extracted. The extracted envelope 50, with its corresponding timing information, is stored in a memory 63. Upon waking up from the sleep mode, the matched filter 60 provides peaks and relative timing of the peaks of the then received relative time shifted multi-path signals from the base stations 18, 19, and 22. The then extracted envelope 51 is stored in a memory 64. Using mean-square error fitting techniques, that are known as such, the stored envelopes 50 and 51 are fitted, by comparing, in block 65, shifted versions of the envelope 51 to the envelope 50, as shifted over one slot in a number of steps. The timing offset $t_{offset}$ is obtained from the best fit. Instead of using such a mean-square error fitting techniques, other fitting techniques might be used as well. The counter 48 is adjusted by the best fit timing offset $t_{offset}$.

Figure 6:
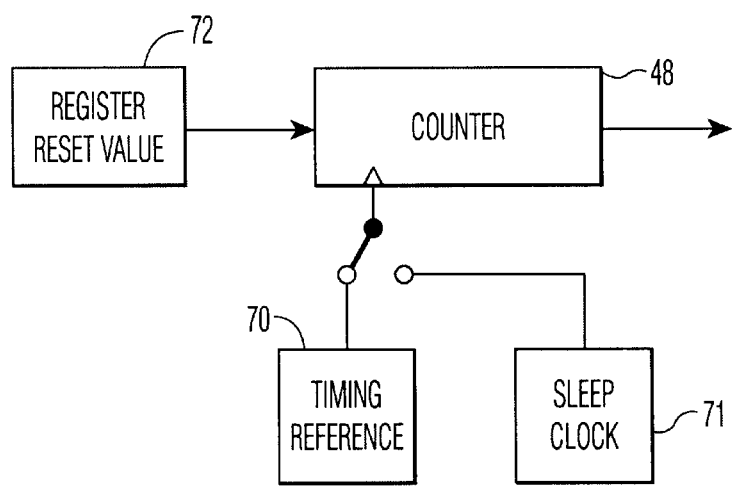
FIG. 6 shows adjustment of a counter in a communication device according to the invention.

FIG. 6 in more detail shows adjustment of the counter 48 in the communication device 24 according to the invention. Upon initial synchronization, the counter 48 represents the instant t=$t_o$, and after wake up from the sleep mode, the counter 48 represents the instant t=$t_l$. In the receive mode, the counter 48 is clocked by a timing reference or reference oscillator 70, and in the sleep mode, the counter 48 is clocked by a sleep clock 71. The clock frequency of the sleep clock 71 is much lower than the clock frequency of the timing reference 70. Typically, the timing reference runs at 19.68 MHz, and the sleep clock at 32 kHz. The timing reference 70 is switched off when the communications device 24 enters the sleep mode, and is switched on again if the communication device 24 wakes up thereafter. The best fit timing offset $t_{offset}$ as computed as described before, is a reset value that is loaded into the counter 48 upon wake up from the sleep mode, when the counter 48 needs to be adjusted. The reset value is stored in a register 72. Upon resetting, the counter 48 that overflows at the slot rate or a multiple thereof, continues from the loaded reset value. The reset value corresponds to maximally the length of the slot 30. Herewith, a very simple re-synchronization is achieved.

In view of the foregoing it will be evident to a person skilled in the art that various modifications may be made within the spirit and the scope of the invention as hereinafter defined by the appended claims and that the invention is thus not limited to the examples provided. The word "comprising" does not exclude the presence of other elements or steps than those listed in a claim.

What is claimed is:

1. A method of re-synchronizing a communication device comprised in a cellular communication system, said method comprising:

initially synchronizing a master timer of said communication device to a first timing reference of a radio base station comprised in said cellular communication system;

determining and storing a first channel profile of received multi-path signals relative to said initial synchronization;

entering a sleep mode after said initial synchronization, in said sleep mode switching off a second timing reference that controls said master timer;

from said sleep mode, entering a receive mode, in said receive mode, switching on said second timing reference;

determining a second channel profile of received multi-path signals;

deriving a timing offset signal from a best fit obtained by fitting said first channel profiled to said second channel profile; and re-synchronizing said master timer on the basis of said derived timing offset signal;

wherein said fitting is a mean-square error fitting method.

2. A method as claimed in claim 1, wherein said mean-square error fitting method fits replica of said second channel profile to said first channel profile, said replica being time shifted versions of said second channel profile as time shifted over a fraction of a reception time slot of said cellular communication system.

3. A method as claimed in claim 1, wherein said initial synchronization is performed by synchronizing said communication device to a primary synchronization channel of said cellular communication system, by then synchronizing said communication device to a secondary synchronization channel of said communication system, and finally by setting said master timer to said first timing reference of a radio base station providing a best communication link, said synchronization to said primary synchronization channel providing multi-path received signals from neighboring base stations, said synchronization to said secondary synchronization channel providing groups codes non-uniquely identifying resolved base stations, and said radio base station providing said best communication being identified by a base station identifying code broadcast by said radio base station over a common control channel.

4. A method as claimed in claim 1, wherein said first and second channel profiles are determined using a signal envelope extracting method based upon splines.

5. A method as claimed in claim 1, wherein said cellular communication system is a spread spectrum system using a slot based reception mode, and said communication device adopts said sleep mode between multiple time slots of said slot based reception mode.

6. A cellular communication system comprising:

a plurality of cells having radio base stations covering said cells;

at least one communication device for communicating with one of said radio base stations, said communication device having a master timer controlling internal timing of said communication device relative to a first timing reference of said one of said radio base stations, means for initially synchronizing said master timer to said first timing reference, means for determining and storing a first channel profile of received multi-path signals relative to said initial synchronization, means for entering a sleep mode after said initial synchronization, in said sleep mode a second timing reference that controls said master timer being switched off, means for entering a receive mode from said sleep mode, in said receive mode, said second timing reference being switched on, means for determining, in said receive mode, a second channel profile of received multi-path signals, means for deriving a timing offset signal from a best fit obtained by fitting said first channel profiled to said second channel profile, and means for re-synchronizing said master timer on the basis of said derived timing offset signal;

wherein said communication device comprises mean-square error fitting means to perform said fitting.

7. A cellular communication system as claimed in claim 6, wherein said mean-square error fitting means is arranged to fit replica of said second channel profile to said first channel profile, said replica being time shifted versions of said second channel profile as time shifted over a fraction of a reception time slot of said cellular communication system.

8. A communication device for use in a cellular communication system having a plurality of cells with radio base stations covering said cells, said communication device being configured to communicate with one of said radio base stations, said communication device comprising:

a master timer controlling internal timing of said communication device relative to a first timing reference of said one of said radio base stations, means for initially synchronizing said master timer to said first timing reference, means for determining and storing a first channel profile of received multi-path signals relative to said initial synchronization, means for entering a sleep mode after said initial synchronization, in said sleep mode a second timing reference that controls said master timer being switched off, means for entering a receive mode from said sleep mode, in said receive mode, said second timing reference being switched on, means for determining, in said receive mode, a second channel profile of received multi-path signals, means for deriving a timing offset signal from a best fit obtained by fitting said first channel profiled to said second channel profile, and means for re-synchronizing said master timer on the basis of said derived timing offset signal;

said communication device comprising mean-square error fitting means to perform said fitting.

9. A communication device as claimed in claim 8, wherein said mean-square error fitting means is arranged to fit replica of said second channel profile to said first channel profile, said replica being time shifted versions of said second channel profile as time shifted over a fraction of a reception time slot of said cellular communication system.

* * * * *